United States Patent [19]
Nakano

[11] Patent Number: 6,034,852
[45] Date of Patent: Mar. 7, 2000

[54] MAGNETIC HEAD DEVICE PRODUCING METHOD WITH CONDUCTIVE PATTERN TERMINAL PORTIONS EXTENDING OUTWARDLY FROM PRINTED WIRING BOARD TO CONTACT HEAD CHIP LEAD WIRES

[75] Inventor: Yuji Nakano, Miyagi, Japan

[73] Assignee: Sony Corporation, Tokyo, Japan

[21] Appl. No.: 09/364,484

[22] Filed: Jul. 30, 1999

Related U.S. Application Data

[62] Division of application No. 08/590,175, Jan. 23, 1996.

[30] Foreign Application Priority Data

Jan. 25, 1995 [JP] Japan .................................. 7-010229

[51] Int. Cl.⁷ .............................. G11B 5/53; G11B 21/18
[52] U.S. Cl. ....................... 360/137; 360/108; 29/603.04
[58] Field of Search .................................. 360/137, 104, 360/123, 126, 108; 29/603.06, 603.04

[56] References Cited

U.S. PATENT DOCUMENTS

| | | | |
|---|---|---|---|
| 4,860,140 | 8/1989 | Momata et al. | 360/123 |
| 5,006,946 | 4/1991 | Matsuzaki | 360/104 |
| 5,485,337 | 1/1996 | Sagara | 360/126 |
| 5,715,122 | 2/1998 | Ohmori et al. | 360/123 |
| 5,859,749 | 1/1999 | Zaroui et al. | 360/104 |

FOREIGN PATENT DOCUMENTS

| | | |
|---|---|---|
| 0 614 173 | 9/1994 | European Pat. Off. . |
| 0 657 875 | 6/1995 | European Pat. Off. . |
| 63-231713 | 9/1998 | Japan . |
| WO-A-95 30984 | 11/1995 | WIPO . |

OTHER PUBLICATIONS

Patent Abstracts of Japan, vol. 013, No. 035 (P–818), Jan. 26, 1989 and JP–A–63 231713 (Hitachi Ltd.), Sep. 27, 1988 (also listed above as reference AM with complete Japanese patent).
Patent Abstracts of Japan, vol. 016, No. 46 (P1307), Feb. 5, 1992 and JP–A–03 248305 (Sanyo Electric Co. Ltd.), Nov. 6, 1991.
Patent Abstracts of Japan, vol. 940, No. 012 and JP–A–06 338028 (Fuji Electrohem Co., Ltd.), Dec. 6, 1994.
Patent Abstracts of Japan, vol. 017, No. 197 (P–1523), Apr. 16, 1993 and JP–A–04 344310 (NGK Insulators Ltd.), Nov. 30, 1992.
Patent Abstracts of Japan, vol. 014, No. 303 (P–10 10), Jun. 29, 1990 and JP–A–02 096911 (Canon, Inc.), Apr. 9, 1990.
Patent Abstracts of Japan, vol. 010, No. 260 (P–494), Sep. 5, 1986 and JP–A–61 085616 (Fuji Photo Film Co.), May 1, 1986.

*Primary Examiner*—Craig A. Renner
*Attorney, Agent, or Firm*—Hill & Simpson

[57] ABSTRACT

A method of providing a magnetic head device comprises providing a head chip composed of a pair of head halves disposed in an opposed and abutting relation to each other. At least one thin film coil is formed on at least one of the opposed abutting surfaces of the pair of head halves and has lead wires electrically connected to the thin film coil. A head base to which a surface of the head chip is mounted is provided. A printed wiring board is bonded to the surface of the head base. The printed wiring board is provided with conductor wires extending thereover and each having a tip end which is brought into electrical contact with one of the lead wires connected to the thin film coil.

2 Claims, 14 Drawing Sheets

MAGNETIC HEAD DEVICE PRODUCING METHOD WITH CONDUCTIVE PATTERN TERMINAL PORTIONS EXTENDING OUTWARDLY FROM PRINTED WIRING BOARD TO CONTACT HEAD CHIP LEAD WIRES

RELATED APPLICATION DATA

This application is a division of U.S. application Ser. No. 08/590,175 filed Jan. 23, 1996, pending. The present and foregoing application claim priority to Japanese application No. P07-010229 filed Jan. 25, 1995. The foregoing application is incorporated herein by reference to the extent permitted by law.

BACKGROUND OF THE INVENTION

1. Field of the Invention

This invention relates to a magnetic head device for use in a video-tape recorder, a magnetic disc apparatus, or the like and a method of producing the magnetic head device, and more particularly to a magnetic head device provided with a coil formed by a thin film formation process and a method of producing such a magnetic head device.

2. Prior Art

A variety of magnetic heads have been employed for magnetic recording/reproducing apparatuses such as video-tape recorders (VTR), magnetic disc apparatuses or the like. Typical conventional magnetic heads include, for example, so-called metal-in-gap type magnetic heads composed of a magnetic core made of ferrite and a metal magnetic film layer formed on a magnetic-gap forming surface of the magnetic core, laminate-type magnetic heads composed of a pair of base members made of a non-magnetic material and a metal magnetic film layer interposed between the pair of base members, or the like. In such a field, in order to meet the requirements such as a high image quality, a digitalized information data, etc., there is an increasing demand for magnetic heads having a good electro-magnetic transformation characteristic in a high-frequency region.

However, the metal-in-gap type magnetic heads are not usable in the high-frequency region due to its large impedance.

On the other hand, in the laminate-type magnetic heads, in case that a track width of recording medium should be decreased to meet a requirement of a high-densification thereof, it is necessary to reduce a thickness of the metal film layer defining a magnetic path. This results in deterioration of a reproduction efficiency. Further, since the magnetic path is formed by the metal magnetic film layer solely, there occurs a problem in controlling a magnetic anisotropy thereof, which makes it difficult to obtain a high reproduction efficiency. That is, an ideal condition for a magnetic anisotropy of magnetic head is generally that an axis of easy magnetization of the metal magnetic film layer is always oriented perpendicular to the direction of magnetic flux. However, it is actually difficult to maintain the perpendicular orientation of the axis of easy magnetization so that only a magnetically isotropic (non-orientation) metal film or uniaxial magnetic anisotropy metal film have been used for the magnetic head.

In order to render the magnetic head usable in a high-frequency region, there has been proposed a magnetic head device provided with a magnetic head chip in which a magnetic path defined by a metal magnetic film is reduced as compared with those of normally used magnetic heads and a thin film coil is formed on a magnetic gap-forming surface by using a thin film formation technique, for example, as disclosed in Japanese patent laid-open publications Nos. 231,713/88 and 248,305/91.

Conventionally used magnetic heads are shown in FIGS. 1 through 5. The magnetic head shown in FIG. 1 is composed of a magnetic head chip 101 provided thereon with a thin film coil, a head base 102 on one surface of which the magnetic head chip 101 is mounted, and a terminal plate 111 generally mounted on the opposite surface of the head base 102. Formed on the terminal plate 111 are printed wiring boards 112 and 113 having terminals 112a and 113a, respectively, which are electrically connected with terminals 117 of the thin film coil through sheathed wires 114 by using a soldering or a conductive adhesive 115. The connecting portions between respective terminals of the printed wiring boards 112 and 113 and the magnetic head chip are covered with a molded resin 116.

Further, there has been a recent demand for a compactness of a rotating drum to which a magnetic head is mounted. In association with such a demand, primarily those for accomplishing a thin thickness of the rotating drum, there has been proposed a magnetic head in which the head chip 101 and the terminal plate 111 are mounted on the same surface of the head base as shown in FIGS. 2 to 5. In the preparation of such a magnetic head as shown in FIG. 2, after mounting the head chip 101 on a primary surface of the head base 102, the terminal plate 111 is fixedly bonded on the same primary surface of the head base 102, as shown in FIG. 3.

Successively, as shown in FIG. 4, one end of each of the sheathed wires 114 is in contact with each terminal of the head chip 101 and electrically connected therewith by using a soldering or a conductive adhesive 115. The other end of each of the sheathed wires 114 is then in contact with each of the terminals 112a and 113a of the printed wiring boards 112 and 113 and electrically connected therewith by using a soldering or a conductive adhesive 115. Thereafter, the connecting portions between the head chip 101 and printed wiring boards 112 and 113 is covered with the molded resin 116.

The thus constructed magnetic head is mounted on a rotating drum (not shown) in such a manner that the head base 102 with the head chip 101 is fitted, on a side of its surface where the terminal plate 111 is not mounted, to the rotating drum. The rotating drum is provided with a rotary transformer which is electrically connected with the other ends of terminals 112 and 113 through sheathed wires by using a soldering or a conductive adhesive.

However, in the preparation of the conventional magnetic heads, it is difficult to maintain the sheathed wires 114 between the terminals 112 and 113 of the terminal plate 111 and the terminals 115 and 116 of the thin film coil provided on the head chip 101 until they are connected with each other. This results in not only complicated operational procedures but also an increase in risk of generating the damage to the sheathed wires by contact with hands when the magnetic head is inverted whereby a yield or a reliability of the product are considerably deteriorated. Furthermore, necessity of the wiring steps for the sheathed wires 114 or the like leads to increase in number of assembling processes so that it becomes extremely difficult to achieve reduction of the production cost.

OBJECT AND SUMMARY OF THE INVENTION

It is therefore an object of the present invention to provide a magnetic head device having a high power and a low fraction defective.

It is another object of the present invention to provide a method of producing a magnetic head device, in which a facilitated connection between a head chip and a head base can be achieved.

Accordingly, in accordance with one aspect of the present invention, there is provided a magnetic head device comprising a head chip composed of a pair of head halves disposed in an opposed abutting relation to each other, at least one thin film coil formed on at least one of opposed abutting surfaces of the pair of head halves and having terminals connected to the thin film coil and disposed on one of the pair of head halves, a head base on one side surface of which the head chip is bonded, a printed wiring board bonded to the surface of the head base, the printed wiring board being provided with conductor wires extending thereover and each having a tip end which is brought into an electrical contact with one of the terminals connected to said thin film coil.

Further, in accordance with another aspect of the present invention, there is provided a method of producing the above-mentioned magnetic head device, comprising the steps of fixing the head chip on the surface of the head base, and connecting tip ends of the conductive wires with terminals of the thin film coil simultaneously with fixing the printed wiring board on the surface of the head base.

The feature of the magnetic head device according to the present invention basically resides in that the head chip and the printed wiring board are bonded to the same surface of the head base, and tip ends of conductive wires extending over the printed wiring board is connected with terminals of the thin film coil which are provided on the head half.

Concretely, the tip end of each conductive wire provided on the printed wiring board is projected outwardly therefrom and disposed spaced upward from a surface thereof so that the tip end comes into contact with the terminals of the thin film coil, which are located on the head half of the head chip, when the printed wiring board is mounted on the head base.

In this case, it is preferred that a pair of thin film coils are respectively provided on opposed abutting surfaces of the head halves of the head chip.

The above-mentioned head halves are suitably made of a non-magnetic material. However, the head halves may be also made of a magnetic material such as Mn—Zn ferrite. Further, it is preferred that the head halves be composed of a base made of a non-magnetic material and a thin film made of a soft magnetic metal material and formed over the base.

Further, as mentioned above, further feature of the present invention resides in the production method of the magnetic head device, including the steps of fixedly mounting the head chip on one side surface of the head base, and fixing the printed wiring board on the same surface of the head base on which the head chip is mounted, and bringing the tip ends of the conductive wires provided on the printed wiring board into contact with terminals of the thin film coil simultaneously with the fixing of the printed wiring board on the head base.

Concretely, the tip ends of the conductive wires and the terminals of the thin film coil are electrically connected with each other by using a soldering or a conductive adhesive.

Thus, in the magnetic head device according to the present invention, the head chip composed of the head halves is fixedly bonded to one side surface of the head base and the terminals, which are electrically connected with the thin film coil, are provided on one of the head halves. Further, the printed wiring board is fixed on the same surface of the head base on which the head chip is mounted such that the tip ends of the conductive wires provided on the printed wiring board is brought into contact with the terminals for the thin film coil formed on one of the head halves of the head chip. That is, in the production of the magnetic head device, when the printed wiring board is bonded to the surface of the head base on which the head chip composed of the head halves is mounted, the tip ends of the conductive wires extending over the printed wiring board come into direct contact with the terminals of the thin film coil formed on one of the head halves of the head chip. The contact portions between the tip ends of the conductive wires and the terminals of the thin film coil are bonded together to establish an electrical connection therebetween. Thus, in the magnetic head device according to the present invention, the connection between the terminals of the respective elements can be performed easily and surely without using particular sheathed wires upon mounting the head chip on the head base.

DETAILED DESCRIPTION OF THE PREFERRED EMBODIMENT

A magnetic head device and a method of producing the magnetic head device according to the present invention are described in more detail by way of the preferred embodiment by referring to the accompanying drawings.

Figure 1:
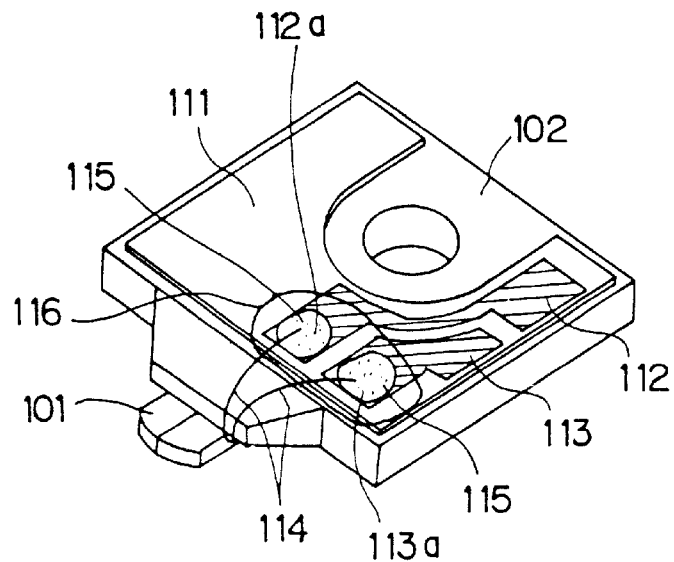
FIG. 1 is a perspective view schematically showing one example of conventional magnetic head devices.
Figure 2:
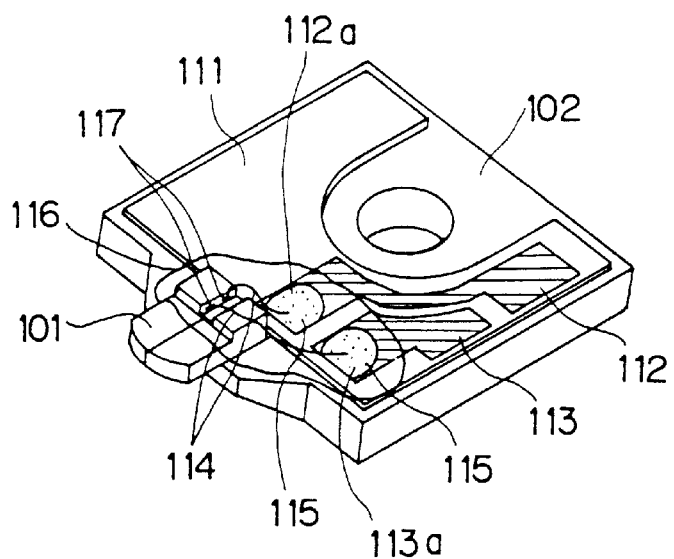
FIG. 2 is a perspective view schematically showing another example of conventional magnetic head devices.
Figure 3:
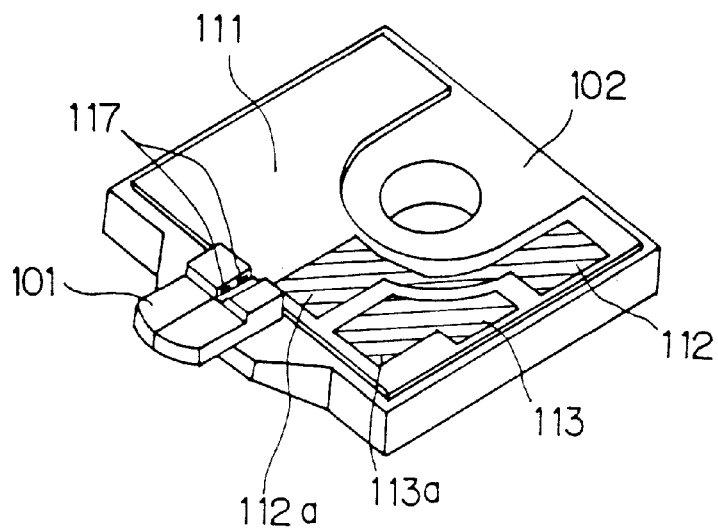
FIG. 3 is a perspective view schematically showing the conventional magnetic head device of FIG. 2, in which a head chip and a printed wiring board are mounted on the same primary surface of a head base.
Figure 4:
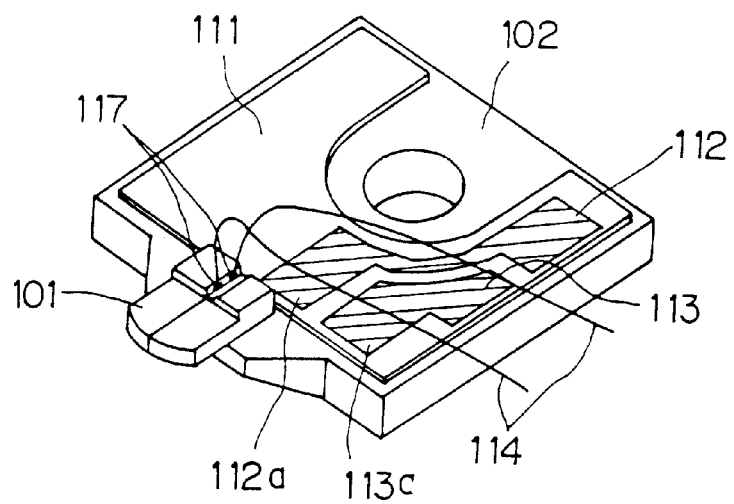
FIG. 4 is a perspective view schematically showing the conventional magnetic head device in which sheathed wires are electrically connected to terminals of the head chip mounted on the primary surface of the head base.
Figure 5:
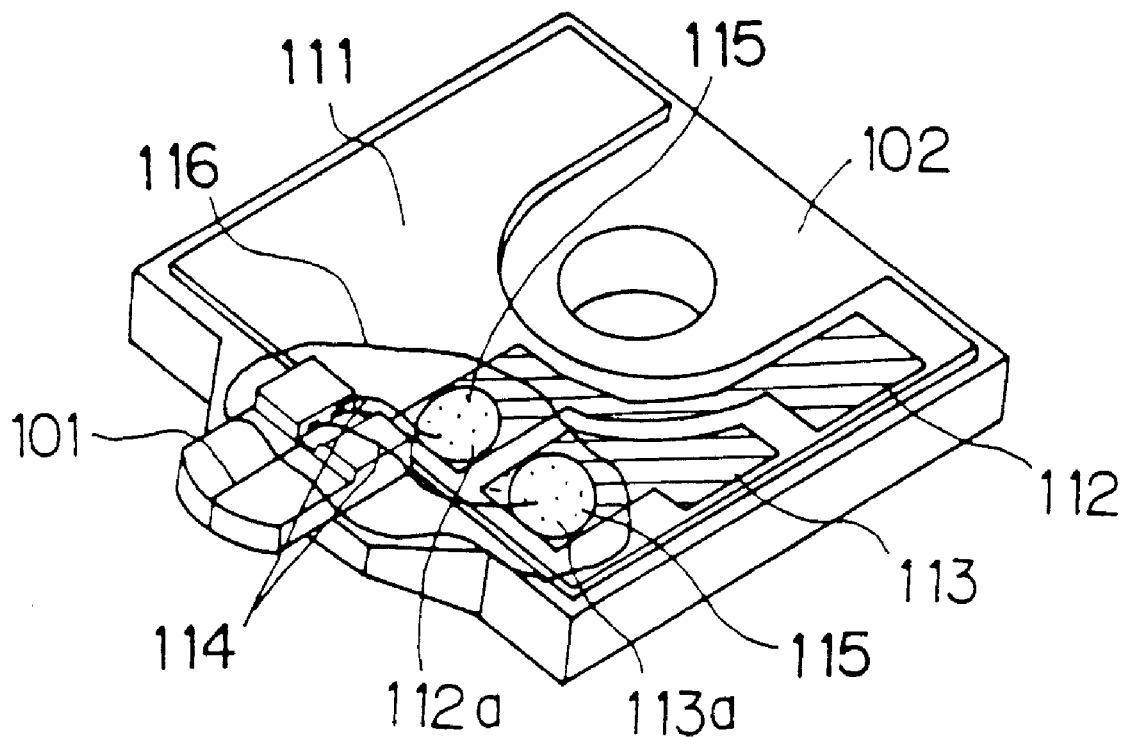
FIG. 5 is a perspective view schematically showing the conventional magnetic head device in which the sheathed wires are electrically connected at the other ends thereof to terminal ends of the conductor wires and the connected portions are covered with a molded resin.
Figure 6:
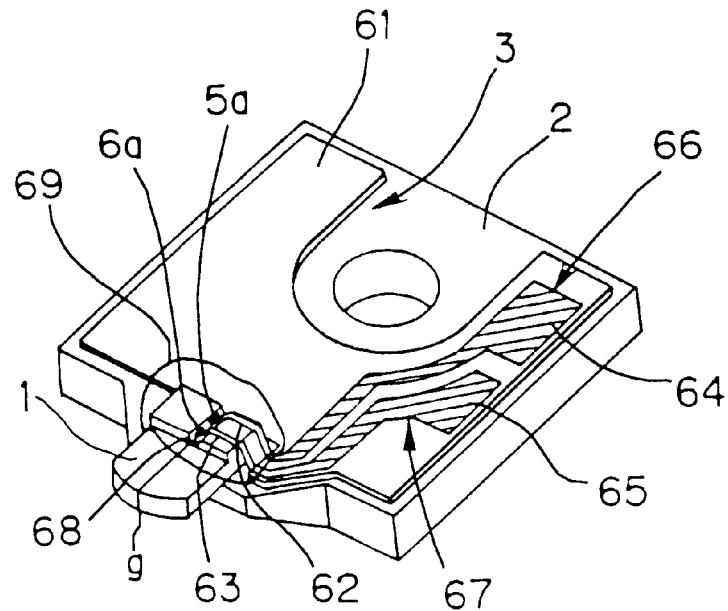
FIG. 6 is a perspective view schematically showing one embodiment of a magnetic head device according to the present invention.

Referring now to FIG. 6, there is shown a magnetic head device according to the present invention, which comprises a head chip 1, a head base 2 to which the head chip 1 is mounted, and a printed wiring board 3 bonded to the head base 2 to electrically connect the head chip 1 with a rotating drum (not shown).

Figure 7:
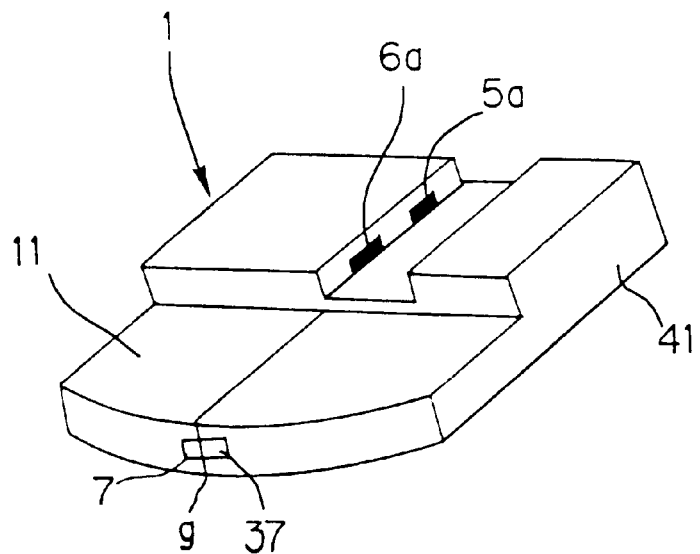
FIG. 7 is a perspective view schematically showing a head chip of the magnetic head device according to the present invention.
Figure 8:
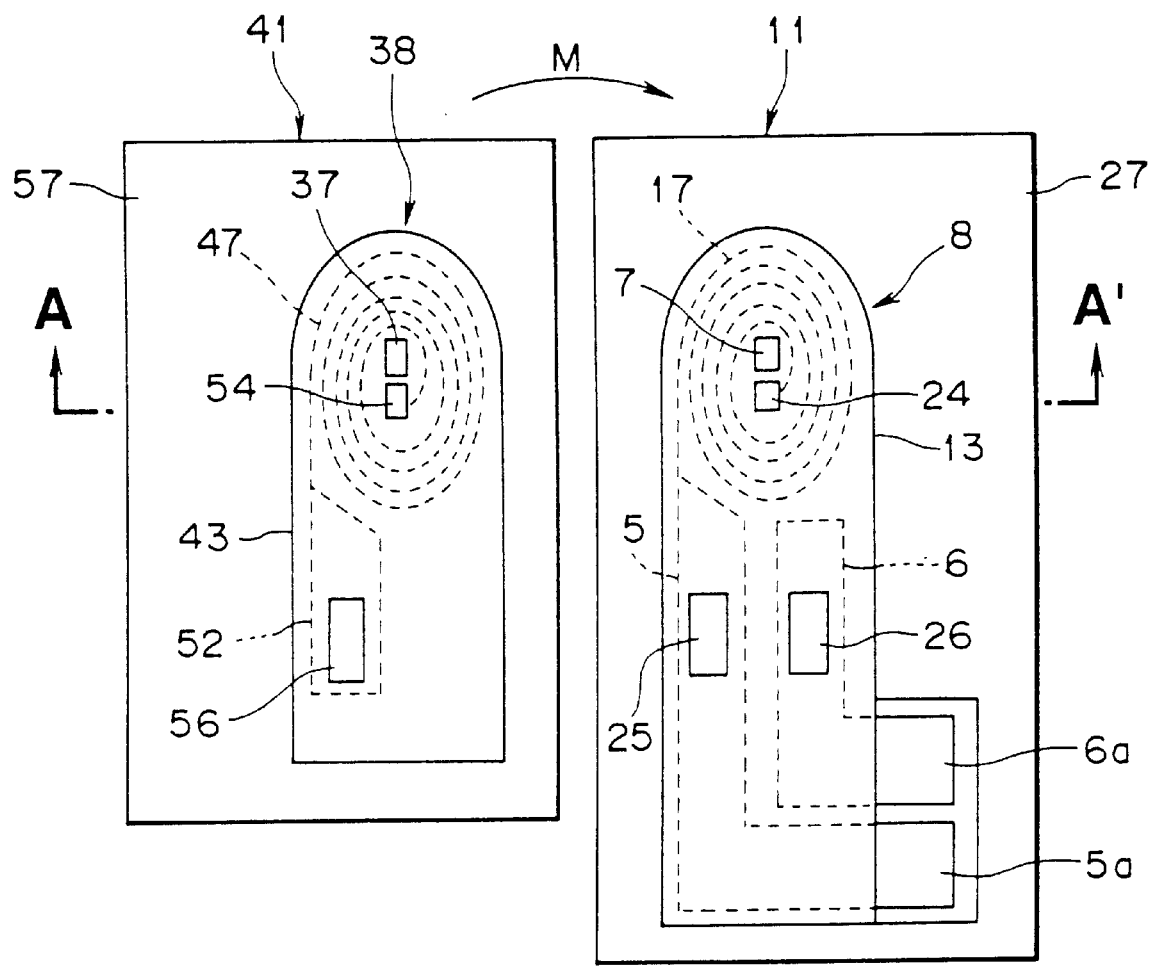
FIG. 8 is an enlarged view schematically showing a portion of abutting surfaces of a pair of head halves constituting the head chip of the magnetic head device according to the present invention.
Figure 9:
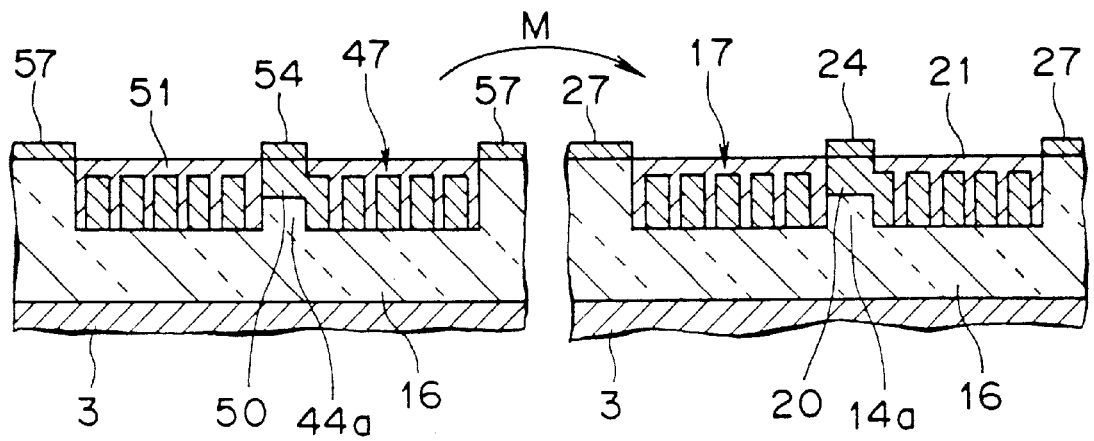
FIG. 9 is a sectional view taken along the broken line A–A' of FIG. 8.

As shown in FIG. 7, the head chip 1 is composed of a pair of head halves 11 and 41 both made of a non-magnetic material. The head halves 11 and 41 are bonded together through a magnetic gap g in an abutting fashion. Further, as shown in FIGS. 8 and 9 in which FIG. 9 shows a section taken along the line A–A' of FIG. 8, the head halves 11 and 41 are provided on abutting surfaces thereof with first and second thin film halves 8 and 38, respectively. The first and second thin film halves 8 and 38 have thereon first and second thin film coils 17 and 47, respectively, which are made of a conductive material. The first and second thin film coils 17 and 47 are formed by using a thin film formation technique such as a photo-lithography or the like. Thus, there is formed a closed magnetic path in which the magnetic gap g having a given azimuth angle is located.

Specifically, the above-mentioned first thin film half 8 is provided in a recess 13 which is formed on a surface of a fused glass 16 deposited on the magnetic layer 7, by using an ion-etching method or the like. The first thin film half 8 includes the first thin film coil 17 made of a conductive metal material and disposed between segments of a magnetic layer 7, a pair of lead-wire electrodes 5 and 6, and a coil terminal portion 20 disposed in the recess 13. The first thin film coil 17 is electrically connected at opposite ends thereof with the coil terminal portion 20 and the lead-wire electrode 5. The first thin film half 8 is covered with a protective coat 21 made of an insulating material except for terminal portions 5a and 6a of the lead-wire electrodes 5 and 6. Metal film portions 24, 25, 26 and 27 are formed on the terminal portion 20, portions of lead-wire electrodes 5 and 6, which are exposed to the surface of the protective coat 21 by a flattening thereof, and a region surrounding the recess 13, respectively. As, illustrated, terminal portion 20 is positioned on a contact portion 14a, formed in the from of a protrusion in recess 13, so as to be positioned above the remainder of thin film coil 17.

On the other hand, the second thin film half 38 is provided in a recess 43, which is formed on a surface of a fused glass 16 deposited on a magnetic layer 37, by using an ion-etching method or the like, in a similar manner to the first thin film half 8. The second thin film half 38 includes a second thin film coil 47 made of a conductive metal material and disposed between segments of the magnetic layer 37, a contact terminal 52 connected to the second thin film coil 47, and a coil terminal portion 50 disposed in the recess 43. The second thin film coil 47 is electrically connected at opposite ends with the coil terminal portion 50 and the contact terminal 52, respectively. The second thin film half 38 is covered with a protective coat 51 made of an insulating material. Metal film portions 54, 56 and 57 are formed on the coil terminal portion 50, a portion of the contact terminal 52, which is exposed to the surface of the protective coat 51 by a flattening thereof, and a region surrounding the recess 43, respectively. As illustrated, terminal portion 50 is positioned on a portion 44a, formed in the form of a protrusion, so as to be positioned above the remainder of thin film coil 47.

The thus constructed head halves 11 and 41 having the first and second thin film halves 8 and 38, respectively, come into an abutting contact with each other in the direction as shown by an arrow M in FIG. 8 and bonded together to form the head chip 1. At this time, electrical connections are established between coil terminal portions 20 and 50 (namely, between the metal film portions 24 and 54), between the segments of the magnetic layers 7 and 37 exposed to the surface of the protective coat 21 and 51, between the metal film portions 26 and 56 (namely between the lead-wire electrode 6 and the contact 56), and between the metal film portions 27 and 57 (namely between the segments of the magnetic layers 7 and 37).

Figure 10:
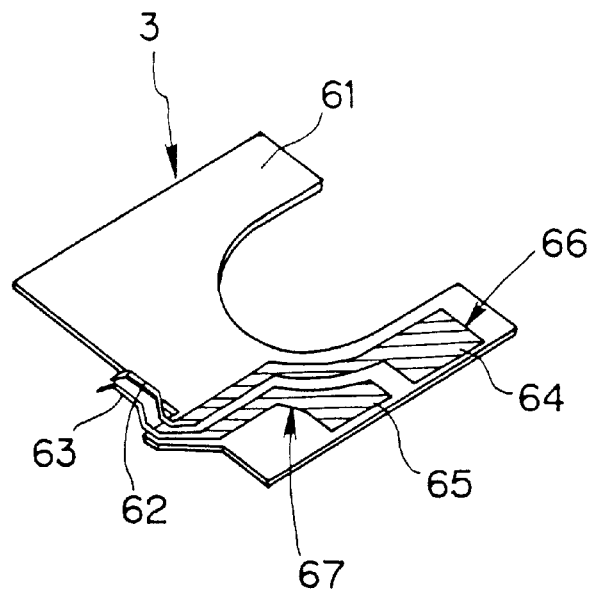
FIG. 10 is a perspective view schematically showing a printed wiring board of the magnetic head device according to the present invention.

As shown in FIG. 10, the printed wiring board 3 is composed of a base plate 61 and conductor wires 66 and 67 disposed on the base plate 61. The conductor wires 66 and 67 are provided at one end thereof with terminal portions 62 and 63 which are brought into a direct contact with the terminal ends 5a and 6a of the lead-wire electrodes 5 and 6 which are in turn connected with the thin film coils 17 and 47, respectively. Meanwhile, the conductor wires 66 and 67 are connected at the other ends 64 and 65 thereof with terminals of the rotating drum (not shown). The number of the terminal portions derived from the conductor wires is determined correspondingly depending upon that of the terminals derived from the thin film coils.

The terminal portions 62 and 63, which extend outwardly from the printed wiring board 3, are projected upward so as to be spaced from a surface thereof. Further, the terminal portions 62 and 63 have a bent shape such that the tip ends thereof can be brought into contact with the terminal end portions 5a and 6a of the lead-wire electrodes 5 and 6 when the printed wiring board 3 is mounted on the head base 2. The contact portions between the terminal portions 62 and 63 of the conductor sires 66 and 67 and the terminal end portions 5a and 6a of the lead-wire electrodes 5 and 6 are electrically connected with each other by using a soldering or a conductive adhesive 68 and then covered with a molded resin 69.

Figure 11:
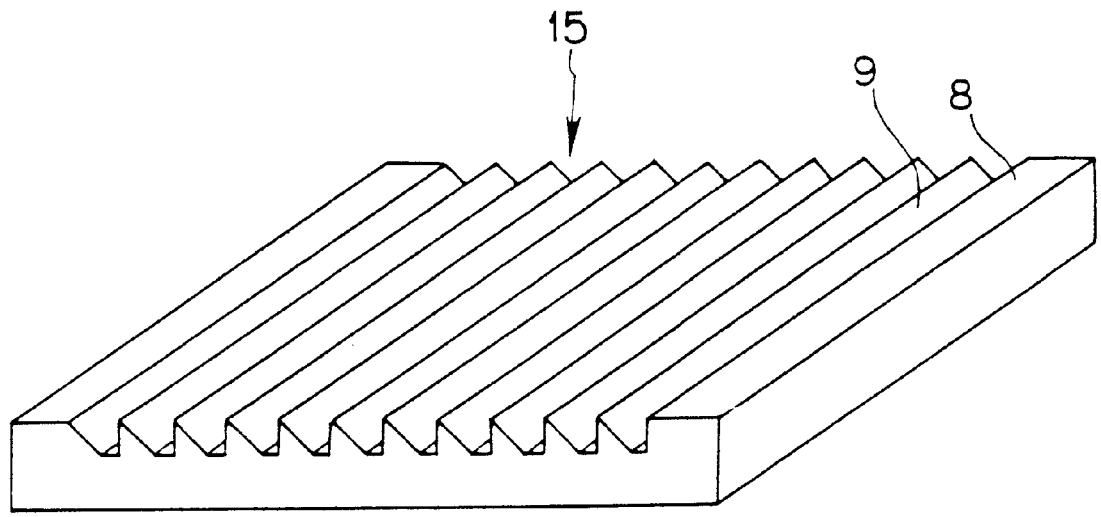
FIG. 11 is a perspective view schematically showing a head chip base on a primary surface of which a plurality of grooves are formed with an inclined angle of about 40 degrees relative to the primary surface.
Figure 12:
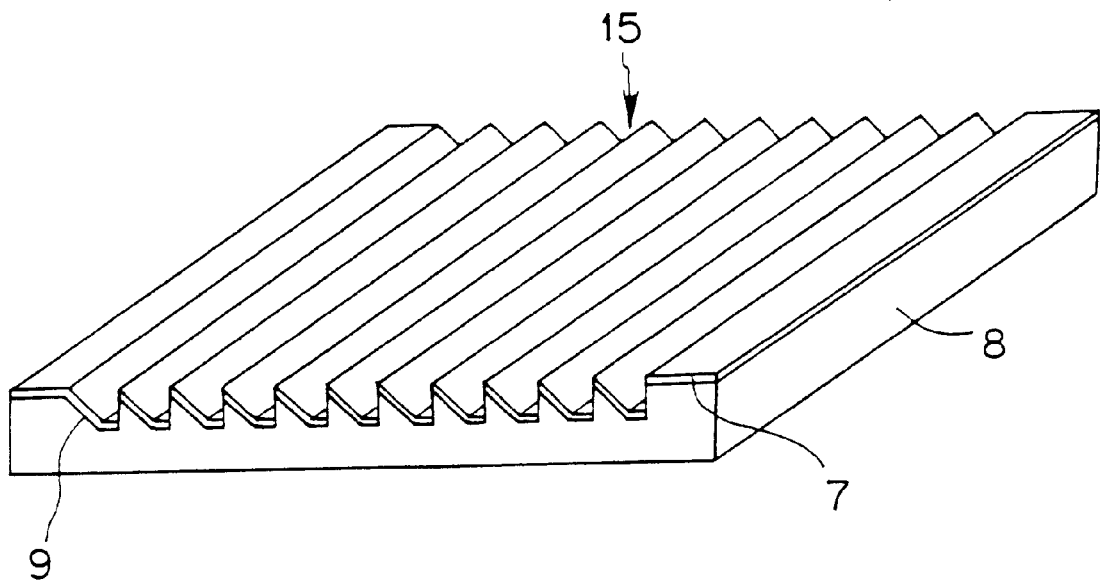
FIG. 12 is a perspective view schematically showing the head chip base provided on the primary surface thereof with a magnetic layer.

In the preparation of the magnetic head device, as shown in FIG. 11, a plate-like head chip base 15 made of a non-magnetic material is first slotted to provide a plurality of grooves on a primary surface thereof. Each groove has an inclined surface with an angle of about 40 degrees relative to the primary surface of the head chip base 15. The angle of the inclined surface of the groove constitutes the azimuth angle of the magnetic gap g. As shown in FIG. 12, a magnetic layer 7 made of a magnetic material such as sendust is then deposited on the primary surface of the head chip base 15. In this case, in order to improve its adherence to the primary surface of the head chip base 15 and its magnetic property, the magnetic layer 7 may be provided through an underlying layer made of oxide or metal such as aluminum on the primary surface of the head chip base 15. Further, a protective coat may be provided on the magnetic layer 7 to prevent an undesired reaction between the magnetic layer 7 and a fused glass 16 filled in the groove 9 described in detail hereinafter.

Figure 13:
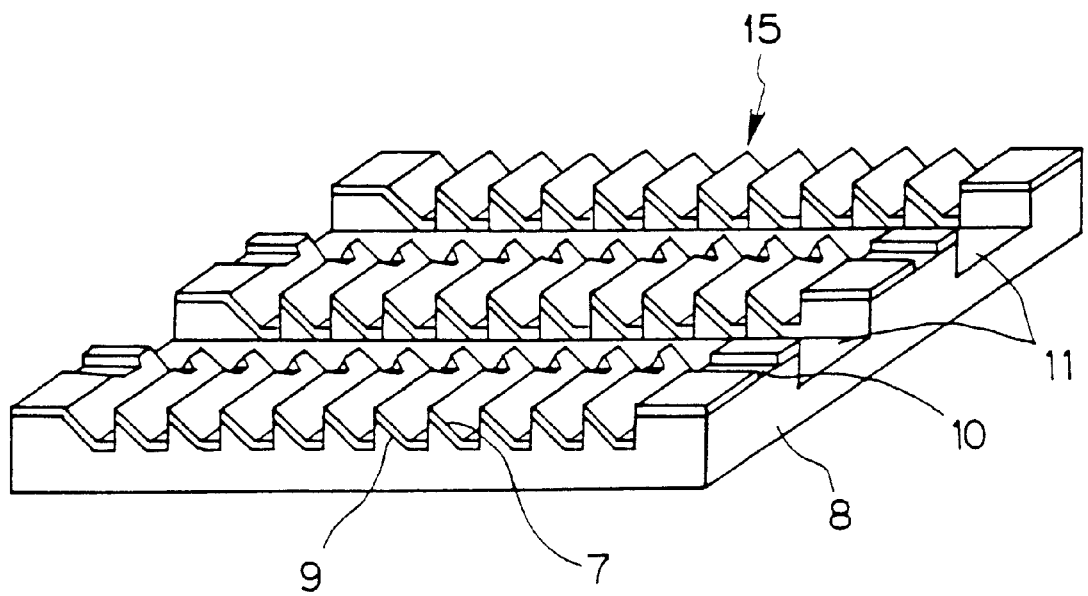
FIG. 13 is a perspective view schematically showing the head chip base in which there are provided additional grooves extending perpendicular to the grooves previously mentioned in FIG. 11 to remove unnecessary portions of the magnetic layer whereby spaces for forming thin film coils and magnetic paths are produced.
Figure 14:
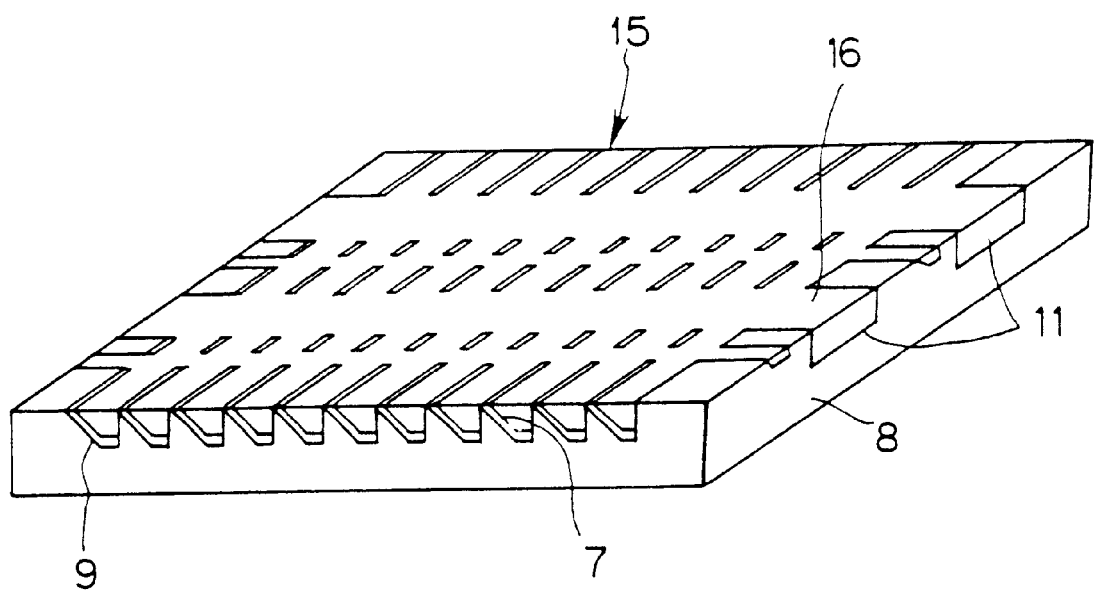
FIG. 14 is a perspective view schematically showing the head chip base which has a fused glass filled in the grooves.

Next, as shown in FIG. 13, grooves 10 and 11 extending perpendicular to the grooves 9 are formed on the primary surface of the head chip base 15. The grooves 10 serve for assuring a space for forming the thin film coil while the grooves 11 serve for removing unnecessary portion of the magnetic layer 7 from the head chip base 15. Successively, the fused glass 16 is filled in the respective grooves as shown in FIG. 14 and unnecessary portion of the fused glass is removed, if desired.

Figure 15:
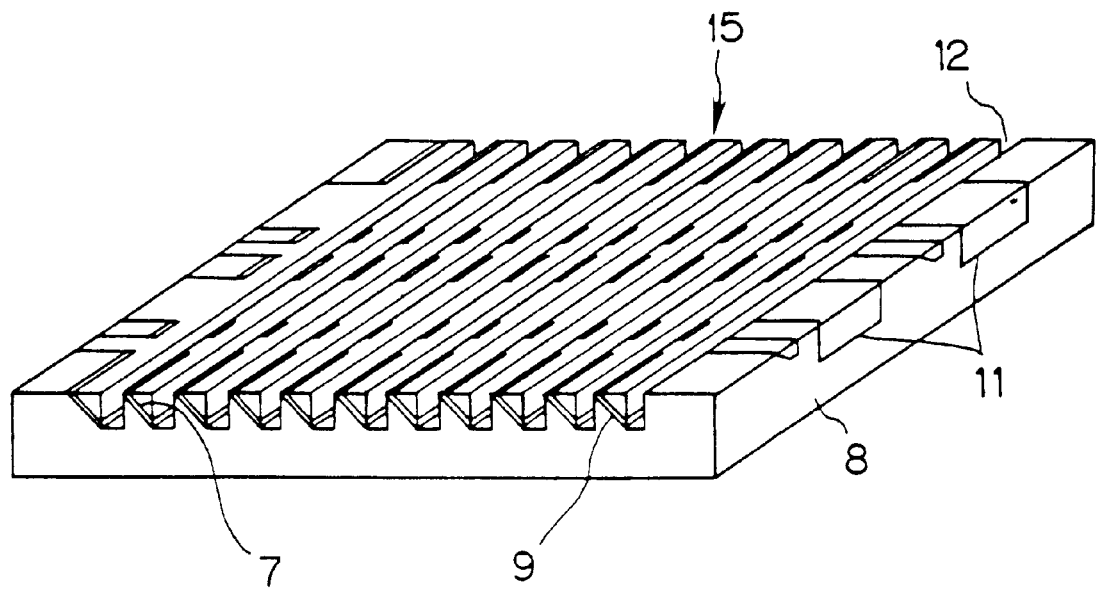
FIG. 15 is a perspective view schematically showing the head chip base on which grooves for restricting a tracking width of the magnetic head device are formed.
Figure 16:
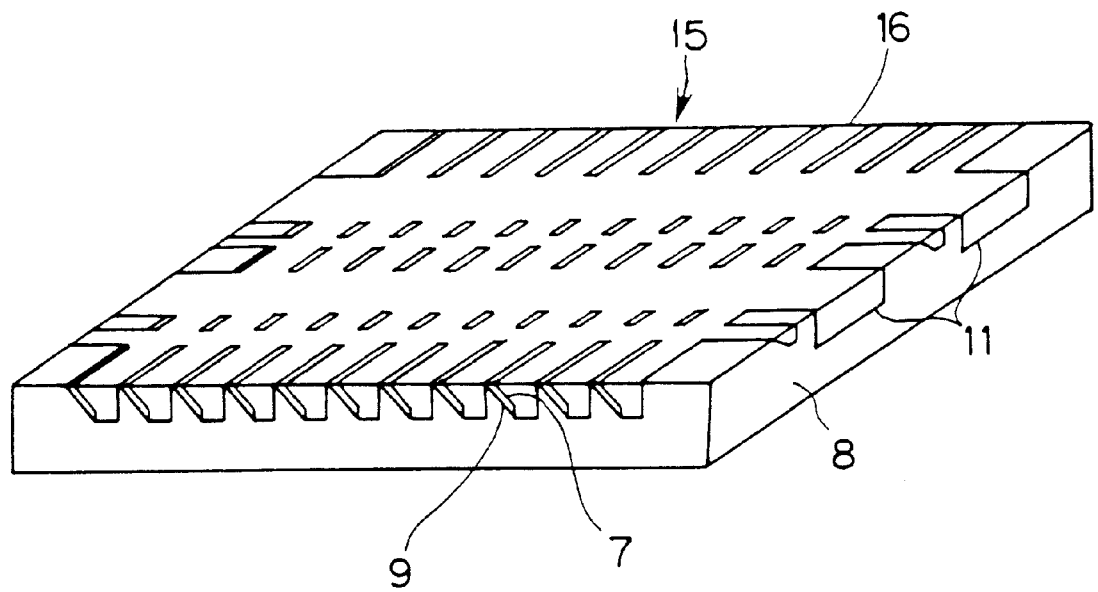
FIG. 16 is a perspective view schematically showing the head chip base in which the grooves for restricting the tracking width are filled with a fused glass.

As shown in FIG. 15, grooves 12 extending parallel with the grooves 9 are slotted to remove the magnetic layer 7 except for that disposed on the inclined surface of each groove 9. The grooves 12 serves for restricting a tracking width. After the grooves 12 are filled with the fused glass, the head chip base 15 is subjected to a grinding to flatten the primary surface of the head chip base 15, as shown in FIG. 16.

Figure 17:
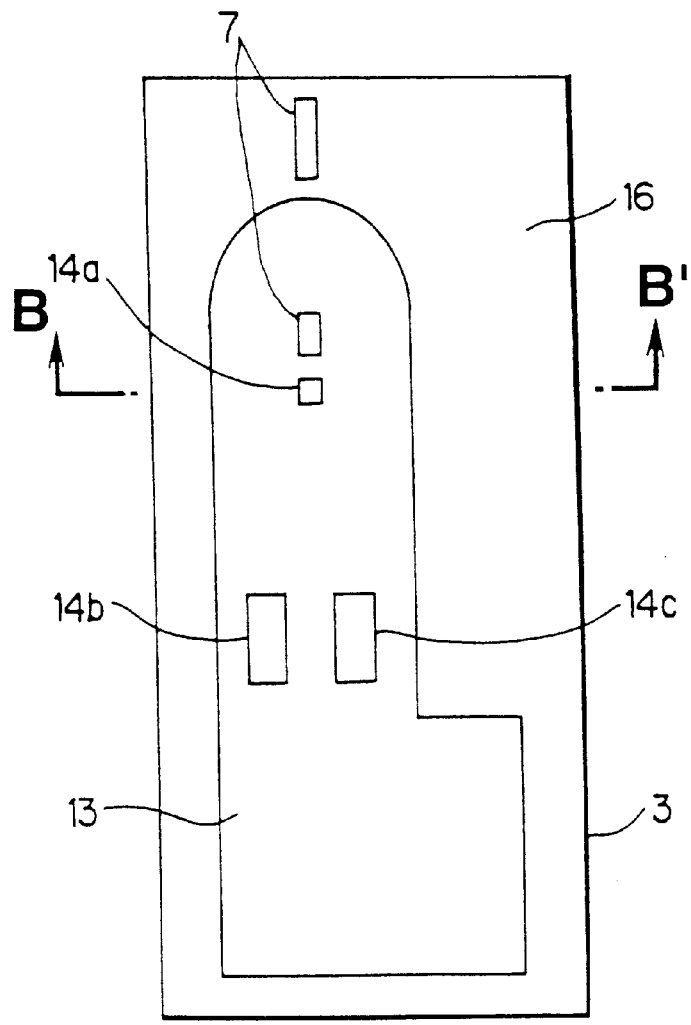
FIG. 17 is an enlarged schematic plan view of the head chip base in which a recess for forming a thin film coil is provided on a surface of the fused glass.
Figure 18:
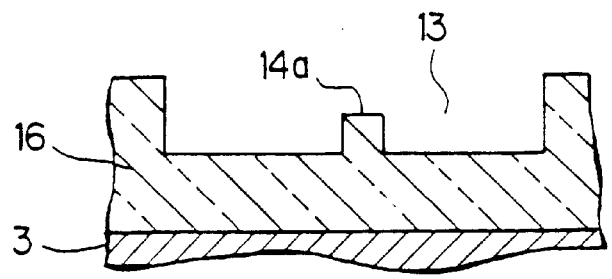
FIG. 18 is a sectional view taken along the broken line B–B' of FIG. 17.

Thereafter, as shown in FIG. 17, by using an ion-etching method or the like, a recess 13 is provided on the surface of the fused glass (on the primary surface of the head chip base 15). The recess 13 serves for forming the thin film coil therein. Formed in the recess 13 are contact portions 14a, 14b and 14c in the form of a protrusion as shown in FIG. 18 which is a sectional view taken along the broken line B–B' of FIG. 17. The contact portion 14a serves for providing thereon an terminal end portion of the thin film coil while the contact portions 14b and 14c serve for providing thereon connecting terminals for the lead-wire electrodes.

Figure 19:
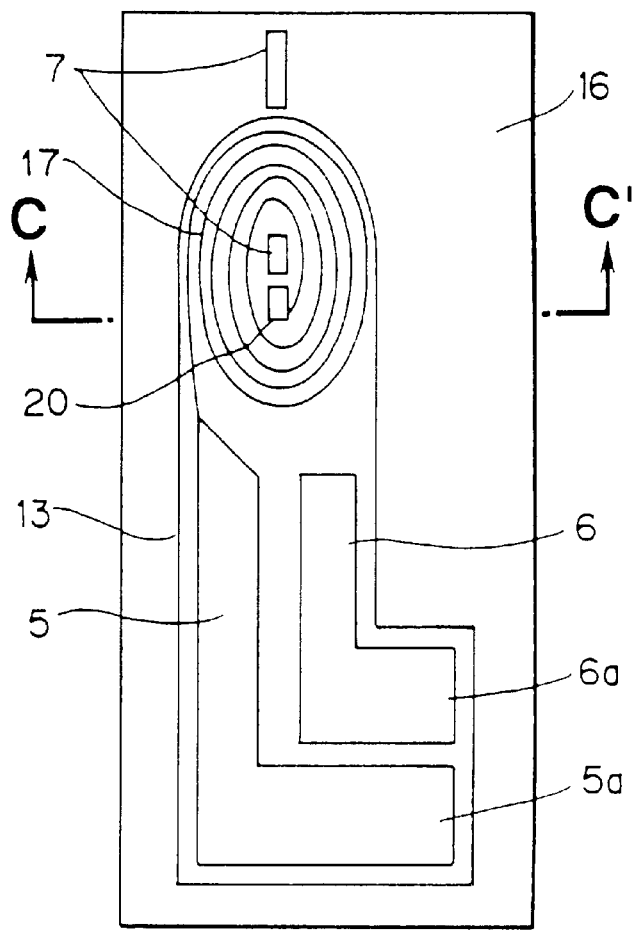
FIG. 19 is an enlarged schematic plan view showing the condition in which first or second thin film half is formed in the recess.
Figure 20:
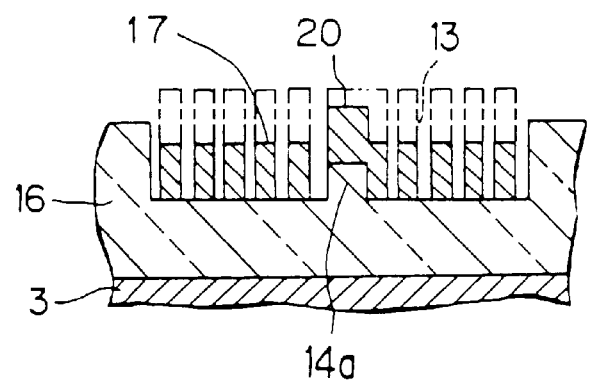
FIG. 20 is a sectional view taken along the broken line C–C' of FIG. 19.

Then, as shown in FIGS. 19 and FIG. 20, (FIG. 20 shows a sectional view taken along the broken line C–C' of FIG. 19), the first and second thin film halves 8 and 38 each having a predetermined pattern are formed in the recess 13 by using a photo-mask having a corresponding pattern. Meanwhile, in FIGS. 19 and 20, only the first thin film half 8 is illustrated. In FIG. 20, the photo-mask for forming the patterns of the thin film coil 17 and the terminal end portion 20 of the thin film coil 17 is illustrated by a phantom line.

Figure 21:
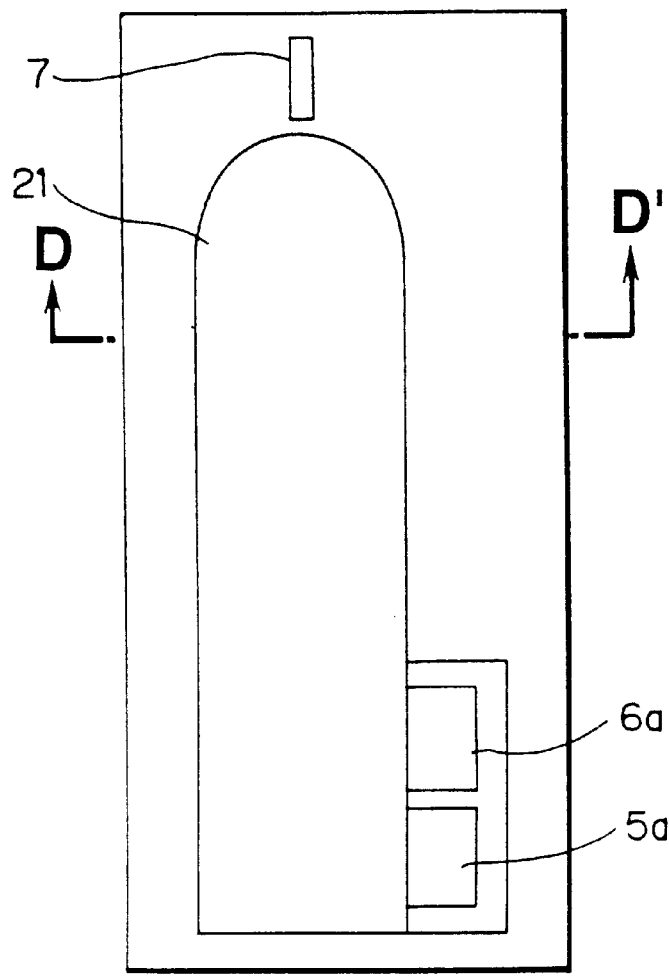
FIG. 21 is an enlarged schematic plan view showing the condition in which the first or second thin film half is covered with a protective coat.
Figure 22:
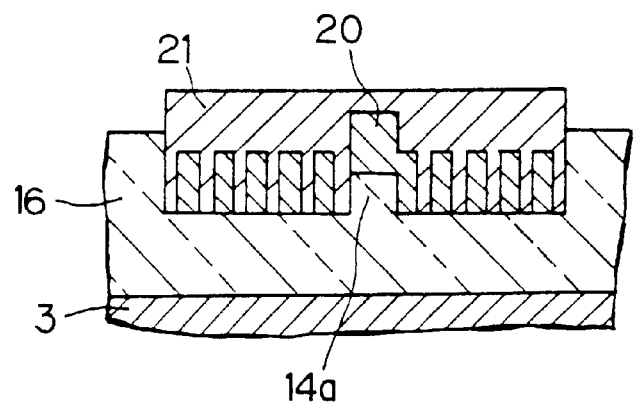
FIG. 22 is a sectional view taken along the broken line D–D' of FIG. 21.

Next, as shown in FIG. 21 and FIG. 22 (FIG. 22 is a sectional view taken along the line D–D' of FIG. 21), a surface of the first thin film half 8 except for tip ends 5a and 6a of the lead-wire electrodes 5 and 6 is covered with a protective coat 21 made of an insulating material by using a sputtering method. The protective coat 21 is then subjected to a grinding to flatten a surface thereof so that given portions of the lead-wire electrodes 5 and 6 are exposed to the surface of the protective coat 21. Then, metal films 24, 25, 26 and 27 are formed on the terminal end portion 20, the given exposed portions of the lead-wire electrodes 5 and 6 and a region of the primary surface of the base plate 15 surrounding the recess 13, respectively.

On the other hand, the second thin film half 38 is covered with a protective coat 51 made of an insulating material. The protective coat 51 is then subjected to a grinding to flatten a surface thereof so that a given portion of a contact terminal 52 is exposed to the surface of the protective coat 51. Deposited on the coil terminal portion 50 of the thin film coil 47, the exposed given portion of the contact terminal 52 and a region of the primary surface of the base plate 15 surrounding the recess 43 are metal films 54, 56 and 57, respectively.

Figure 23:
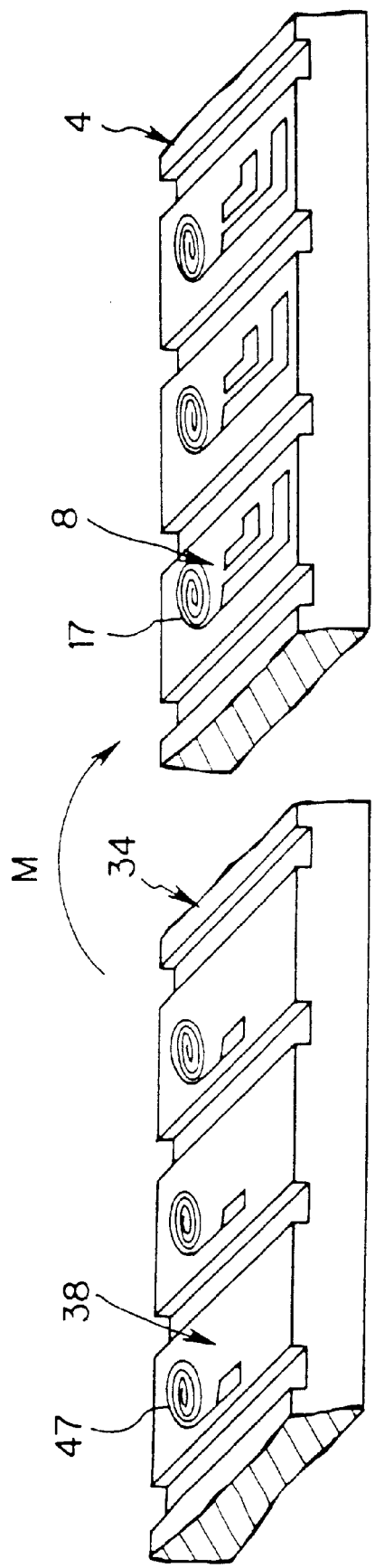
FIG. 23 is a perspective view schematically showing a pair of segment blocks 4 and 34 of the head chip base which are then brought into an abutting contact with each other and bonded together.

The thus constructed blocks for the head halves 11 And 41 are cut into segment blocks 4 and 34 having an appropriate dimension in which a plurality of the thin film halves 8 and 38 are formed, as shown in FIG. 23. Both the segment blocks 4 and 34 abuts against each other in the direction indicated by an arrow M in the figure and are integrally bonded to each other such that the given portions of the first and second thin film halves 8 and 38, on which conductive metal films are provided, are brought into contact with each other to establish an electrical connection therebetween.

Thereafter, the thus integrated segment blocks 4 and 34 are cut into individual pieces composed of a pair of head halves 11 and 41 which carry the first and second thin film halves 8 and 38, respectively. The respective pieces are then subjected to subsequent processes to finish individual head chips 1.

Figure 24:
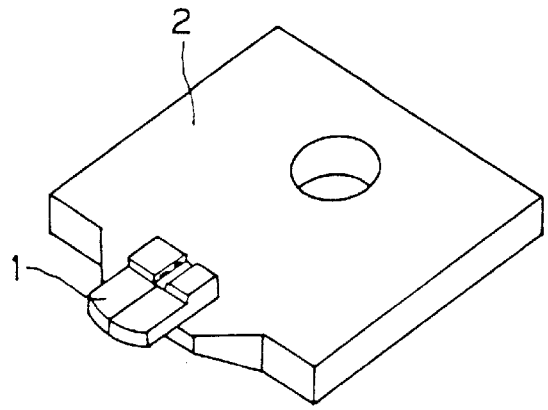
FIG. 24 is a perspective view schematically showing a head base on one surface of which the head chip is mounted.
Figure 25:
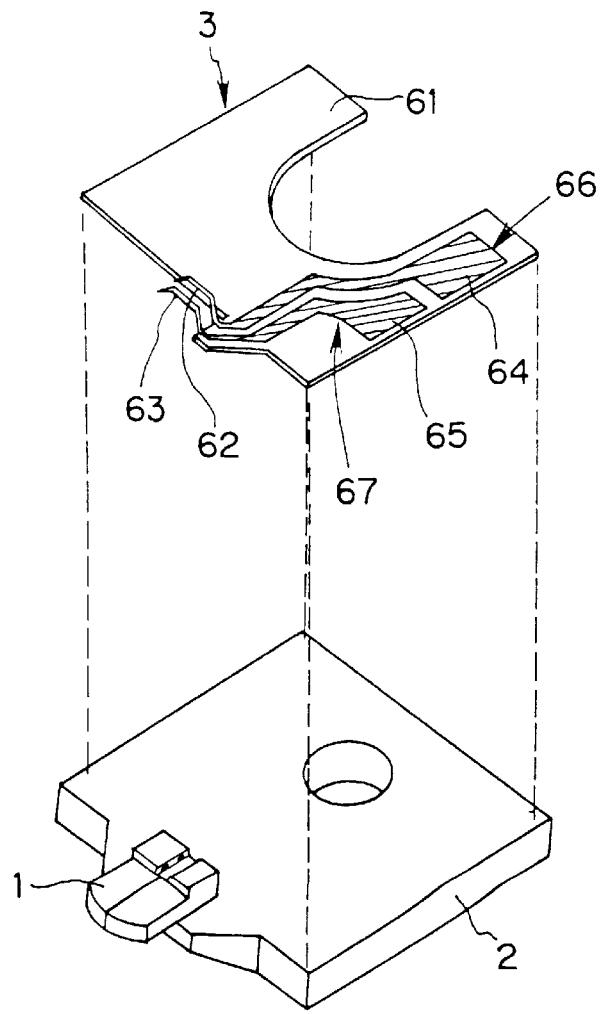
FIG. 25 is a perspective view schematically showing the head base together with a printed wiring board to be mounted on the surface of the head base on which the head chip is already mounted.

The head chip 1 thus obtained is then mounted on a primary surface of the head base 2, as shown in FIG. 24. Successively, the printed wiring board 3 is bonded to the primary surface of the head base 2, as shown in FIG. 25. The printed wiring board 3 is provided with conductor wires 66 and 67 made of a conductive metal material. The conductor wires 66 and 67 are subjected to an appropriate machining such as a press-working so that front end portions of the conductor wires 66 and 67 are bent into given shapes to form terminal ends 62 and 63, respectively.

When the thus formed printed wiring board 3 is bonded onto the head base 2, the terminal ends 62 and 63 of the conductor wires 66 and 67 are disposed in a floating manner on the printed wiring board 3 and connected with the tip ends 5a and 6a of the lead-wire electrodes 5 and 6 which serve as the external terminal ends of the thin film coil 17. The terminal ends 62 and 63 is then electrically connected with the tip ends 5a and 6a by using a soldering or a conductive adhesive 68. The connecting portions between the terminal ends 62 and 63 and the tip ends 5a and 6a of the conductor wires 5 and 6 are covered with a resin material 69 by a resin-molding method.

As mentioned above, the magnetic head device according to the present invention includes the head chip 1 composed of a pair of head halves 11 and 41 disposed in an opposed abutting relation to each other. The head halves 11 and 41 are provided, at opposed abutting surfaces thereof, with thin film coils 17 and 47 which are electrically connected with the lead-wire electrodes 5 and 6 having the tip ends 5a and 6a, respectively, which are provided on the head half 11. The head chip 1 is mounted on one side surface of the head base 2 and bonded thereto. Further, the printed wiring board 3 is adhered onto the same surface of the head base 2. The printed wiring board 3 is provided thereon with conductor wires 66 and 67 which are formed corresponding to the number of the terminals derived from the thin film coils 62 and 63 (in this embodiment, two conductor wires are provided). When the printed wiring board 3 is mounted on the head base 2, the terminal ends 62 and 63 of the conductor wires 66 and 67 are directly connected to the tip ends 5a and 6a of the lead-wire electrodes 5 and 6. That is, in the preparation of the magnetic head device, when the printed wiring board 3 is mounted on and bonded to one side surface of the head base 2 on which the head chip 1 is also bonded, the terminal ends 62 and 63 of the conductor wires 66 and 67 on the printed wiring board 3 is directly contacted with and therefore electrically connected with the tip ends 5a and 6a of the lead-wire electrodes 5 and 6 exposed on a surface of the head chip 1. As a result, upon mounting the printed wiring board 3 to the head base 2, an electrical connection between the head chip 1 and the printed wiring board 3 can be easily and surely accomplished without using a sheathed wire or the like.

Accordingly, not only a reliability of the product is enhanced to a great extent, but also the production cost and the production time can be considerably reduced because a bonding process between the respective terminals by using sheathed wires can be omitted.

As mentioned above, in accordance with the present invention, it becomes possible to manufacture a magnetic head device having a high power with a low fraction defective. Further, there can be provided a method of producing such a magnetic head in which a head chip is easily mounted on a head base.

What is claimed is:

1. A method for securing a magnetic head to a head chip comprising the steps of:

a) providing a head chip composed of a pair of head halves disposed in an opposed and abutting relation to each other, and having lead wires of a thin film coil disposed on one of said pair of head halves;

b) providing a head base having a side surface on which said head chip is mounted;

c) bonding a printed wiring board to said side surface of the head base, said printed wiring board having a wire pattern formed thereon comprising two conductor wires, each of which has a unitary terminal portion formed in situ with the formation of the wire pattern and which is an extension of one of the conductor wires and which has a tip end which is brought into electrical contact with a respective one of said lead wires of said thin film coil, the unitary terminal portions extending outwardly from the printed wiring board and projecting upwardly therefrom and away from said side surface of said head base and being sufficiently rigid so as to be spaced from said side surface of said head base in a self-supporting manner, and each of the terminal portions having a bend such that the tip ends thereof will contact the lead wires of said thin film coil in a self-registering manner as the printed wiring board is mounted on the head base; and d) securing said head chip on the side surface of said head base while bringing said tip ends of said conductor wires into contact with said lead wires of said thin film coil.

2. The method according to claim 1, wherein said tip ends of said conductor wires are electrically connected with said lead wires of said thin film coil by using a soldering or a conductive adhesive.

* * * * *